(12) United States Patent
Hillegass et al.

(10) Patent No.: US 7,062,468 B2
(45) Date of Patent: Jun. 13, 2006

(54) LICENSED DIGITAL MATERIAL DISTRIBUTION SYSTEM AND METHOD

(76) Inventors: James C. Hillegass, 18150 Breezy Point Rd., Woodland, MN (US) 55391; Yaobing Deng, 911-22nd Ave. South, Apt. 162, Minneapolis, MN (US) 55404; Mark Eastom, 53-15th Ave. SW., New Brighton, MN (US) 55112; Richard R. Fritz, 8425 Passfield Turn, Maple Grove, MN (US) 55447; John C. Gateley, 15390-18th Ave. N., Apt. 1107, Plymouth, MN (US) 55447; James A. Grinsfelder, 1466 Lincoln Ave., St. Paul, MN (US) 55105; Stephen A. Grove, 3901-45th Ave. South, Minneapolis, MN (US) 55406; Eric Steven Hockett, 322 Clifton Ave., 102, Minneapolis, MN (US) 55403; Nikolay G. Sokratov, 3951 Quentin Ave. S., St. Louis Park, MN (US) 55416; James G. Swanson, 1715 Eleanor Ave., St. Paul, MN (US) 55116; John S. Thompson, 15960 35th St., box 113, Afton, MN (US) 55001; Boris Mamedov, 9117-11th Ave. South, Apt. 5, Hopkins, MN (US) 55343; James A. Nordgaard, 2925 Monterey Ave. South, St. Louis Park, MN (US) 55416; Paul E. Onnen, 26021 SE. 27th St., Issaquah, WA (US) 98029

( * ) Notice: Subject to any disclaimer, the term of this patent is extended or adjusted under 35 U.S.C. 154(b) by 228 days.

(21) Appl. No.: 09/845,041

(22) Filed: Apr. 27, 2001

(65) Prior Publication Data
US 2002/0065781 A1 May 30, 2002

Related U.S. Application Data

(60) Provisional application No. 60/200,196, filed on Apr. 28, 2000.

(51) Int. Cl.
*G06F 17/40* (2006.01)
*H04L 9/00* (2006.01)

(52) U.S. Cl. ............................ 705/59; 705/1; 705/78; 709/201; 703/200

(58) Field of Classification Search .................. 705/59, 705/1, 78
See application file for complete search history.

(56) References Cited

U.S. PATENT DOCUMENTS 5,260,999 A * 11/1993 Wyman ....................... 705/59

(Continued)

FOREIGN PATENT DOCUMENTS

| CA | 2306579 A1 * | 10/2001 |
|----|-----|-----|
| JP | 2003 178164 | 6/2003 |

OTHER PUBLICATIONS

Peter Sohal, J. River, Inc., J. River Music Exchangeä enables Secure Sales and Licensing of On-line Music, Press Release, Feb. 26, 1999, Minneapolis, MN.

*Primary Examiner*—James P. Trammell
*Assistant Examiner*—Daniel L. Greene
(74) *Attorney, Agent, or Firm*—Beck & Tysver, P.L.L.C.

(57) ABSTRACT

A system and method distribute licenses for copyrighted material separate from the copyrighted material itself. A producer or "vendor" of copyrighted material registers the material with a License Provider. The License Provider returns an encryption code for the producer to attach to the materials which are in digital form. The vendor distributes that material to one or more users who purchase a license from the License Provider. The license includes an encryption key to decrypt the file containing the materials. The system and method incorporate security measures to prevent unlicensed use and distribution of the materials.

8 Claims, 6 Drawing Sheets

U.S. PATENT DOCUMENTS

| | | | |
|---|---|---|---|
| 5,438,508 A * | 8/1995 | Wyman | 705/8 |
| 5,694,334 A | 12/1997 | Donahue et al. | |
| 5,745,879 A * | 4/1998 | Wyman | 705/1 |
| 5,765,152 A | 6/1998 | Erickson | |
| 5,832,083 A | 11/1998 | Iwayama et al. | |
| 5,933,498 A | 8/1999 | Schneck et al. | |
| 5,935,243 A | 8/1999 | Hasebe et al. | |
| 5,974,141 A | 10/1999 | Saito | |
| 5,987,441 A | 11/1999 | Lee et al. | |
| 6,002,768 A | 12/1999 | Albanese et al. | |
| 6,009,173 A | 12/1999 | Sumner | |
| 6,169,976 B1 * | 1/2001 | Colosso | 705/59 |
| 6,189,146 B1 | 2/2001 | Misra et al. | |
| 6,223,291 B1 | 4/2001 | Puhl et al. | |
| 6,226,618 B1 | 5/2001 | Downs et al. | |
| 6,247,130 B1 | 6/2001 | Fritsch | |
| 6,260,024 B1 | 7/2001 | Shkedy | |
| 6,363,486 B1 * | 3/2002 | Knapton, III | 713/200 |
| 6,499,035 B1 * | 12/2002 | Sobeski | 707/103 R |
| 6,578,014 B1 | 6/2003 | Murcko | |
| 6,587,837 B1 * | 7/2003 | Spagna et al. | 705/26 |
| 6,775,655 B1 * | 8/2004 | Peinado et al. | 705/59 |

* cited by examiner

LICENSED DIGITAL MATERIAL DISTRIBUTION SYSTEM AND METHOD

This application claims priority under 35 U.S.C. §119(e) to U.S. Ser. No. 60/200,196, filed Apr. 28, 2000.

FIELD OF THE INVENTION

The present invention relates generally to a system and method for distributing copyrighted materials in digital form and for distributing licenses for the copyrighted materials. More particularly, the present invention relates to a system for dispensing licenses independently of the associated copyrighted materials while safeguarding against unauthorized copying and use of the materials.

BACKGROUND OF THE INVENTION

Music, text, images and other types of copyrightable subject matter are now routinely produced in digital or electronic form for distribution in physical form (e.g. compact disks, digital video disks) or electronically (e.g. via file transfer between networked computers). Electronic distribution makes it possible to distribute products cost-effectively by eliminating packaging, transportation and other costs associated with getting physical goods to the consumer. Because hard drive space is significantly cheaper than retail shelf space, distributors can offer more product choices and can make their products available at more digital locations, i.e. web sites.

Computer networking technology has brought new challenges to the policing of copyright interests in materials distributed in or convertible to digital form. Electronic copies are effortlessly created and/or distributed from one computer to another or many others via local networks (LANs), wide area networks (WANs) and the Internet.

Unauthorized copying of digital materials is of particular concern in the music industry, though efforts have been made to prevent it. Technology has been employed to secure audio materials and receive payment by requiring consumers to purchase from a centralized point in an effort to control access to the files. Access to the files may be further restricted by requiring that the files be played on a proprietary player that has the ability to verify that payment for the file has been made. In this model, consumers can only access the subset of audio that is made available at the hosting company's site, and files can only be played on the hosting company's player, which may not be the consumer's player of choice. Sony recently announced the introduction of a pocket-sized digital music player. The player receives small device-specific memory cards which carry digital files that are available for purchase and download over the internet.

U.S. Pat. No. 5,765,152 to Erickson ("Erickson '152") describes a system and method for managing copyrighted electronic media. Erickson '152 describes the use of a registration system to make documents available over a computer network, and an authorization system for end-users to obtain desired level of permission to use and alter the document, and then to subsequently register the resulting derivative work. According to the Erickson '152 system, permissions are attached to the document file, and the user downloads or accesses the document file with the appropriate permissions attached to the document file. Thus, the permissions must co-exist with the documents. This is disadvantageous for a number of reasons. For example, if the user loses a document file, he/she also loses their permission to use the document. Further, Erickson's system contemplates distribution of documents through specific servers, i.e. the author does not have the option of posting the document from any server he/she chooses and this may be insufficient to meet the author's marketing objectives.

Therefore, authors and producers of copyrightable materials seek secure ways of distributing copyrightable materials in electronic form to purchasers of the materials, and allowing these bona fide purchasers convenient access to the purchased materials, while at the same time preventing subsequent unauthorized copying. Further, it would be advantageous for authorized digital materials to be portable from one computer to another for the authorized purchaser.

SUMMARY OF THE INVENTION

What has been needed is a secure and convenient method of distributing music files, where a producer of the music can distribute files to potential customers, but does not have to attend to licensing and selling functions. Further, to protect the artists' interests, there has been a need to distribute music files such that the music is secure and cannot be easily copied. Finally, a flexible rights management utility preferably allows various purchase plans, such as limited time purchases (renting) and pay-peruse (like some tax systems).

According to the present invention, a system and method allow a user to download copyrighted material from any of a number of sources of copyrighted works, and to then purchase licenses to use the material from a License Provider.

Because Vendors can store their Products on their own servers, they have complete control over the content of a Product and can change content with minimal difficulty. Further, Products can be offered for download from a variety of places that may be convenient for Users. For example, a Vendor may make the soundtrack of a movie available from the movie's website. Additionally, the Vendor can make the same soundtrack available in a website music store. Finally, a file that has been downloaded and licensed by one User can be shared with then licensed by a second User since files are not changed after licensing to one User. The user's rights to the content vary depending on the type of license. Licenses include (but are not limited to) full usage, pay-per-play, and restricted time.

While Products are available at multiple sites, Users have a convenient single source for licenses, the License Provider.

The system and method further provide security for artists and producers against unauthorized copying. A software component running on User's computers checks to make sure that the appropriate Product License has been purchased and that that Product License is for the computer on which the Product is stored.

BRIEF DESCRIPTION OF THE DRAWINGS

An exemplary version of a system and method for distributing and licensing copyrighted materials is shown in the figures wherein like reference numerals refer to equivalent structure throughout, and wherein.

DETAILED DESCRIPTION OF PREFERRED EMBODIMENT(S)

As used herein, "copyrighted materials" means any work that is protected by copyright laws of the U.S. or other countries, including without limitation: literary works; musical works, including any accompanying words; dramatic works including any accompanying music; pantomimes and choreographic works; pictorial, graphic, and sculptural works, motion pictures and other audiovisual works; sound recordings; and architectural works.

"Electronic media" means any electronic form on which copyrightable material can be stored in the form of a digital representation, including without limitation: computer memory, CD, CD-Rom, magnetic disk, or digital video disk. "Electronic media" also includes digital files in transit over a computer network, such as a Local Area Network (LAN), Wide Area Network (WAN) or the World Wide Web ("Internet"). It is contemplated that additional kinds of "electronic media" may now exist and may come into existence in the future and will perform the function of storing copyrightable material in the form of a digital representation. For example, some manufacturers, like Sony, are creating device-specific memory cards for storing music files for playback on the devices and such devices are within the definition of "electronic media".

"Product" means a file, container, object or the like that is stored on or in electronic media that carries one or more pieces of copyrighted material.

A "Vendor" means any entity that makes products available. The Vendor may be an entirely separate entity from the License Authority, discussed below, or it may be associated or affiliated in some manner with the License Authority, or it may be the same entity as the License Authority. Types of Vendors include but are not limited to: artists, producers, record labels and licensing organizations such as ASCAP/BMI.

A preferred embodiment of the present invention is used in conjunction with Products that are multi-track, multi-media music files. Such files can include, for each track, the music track itself, liner notes, lyrics, images, and information about the track such as the artist, other musicians, the year of release and the like. Portions of the detailed description to follow will focus on the use of the invention in conjunction with such multi-track, multi-media music Products, but it is to be understood that the system and method of the present invention are intended to be used in conjunction with any Products regardless of content.

Figure 1:
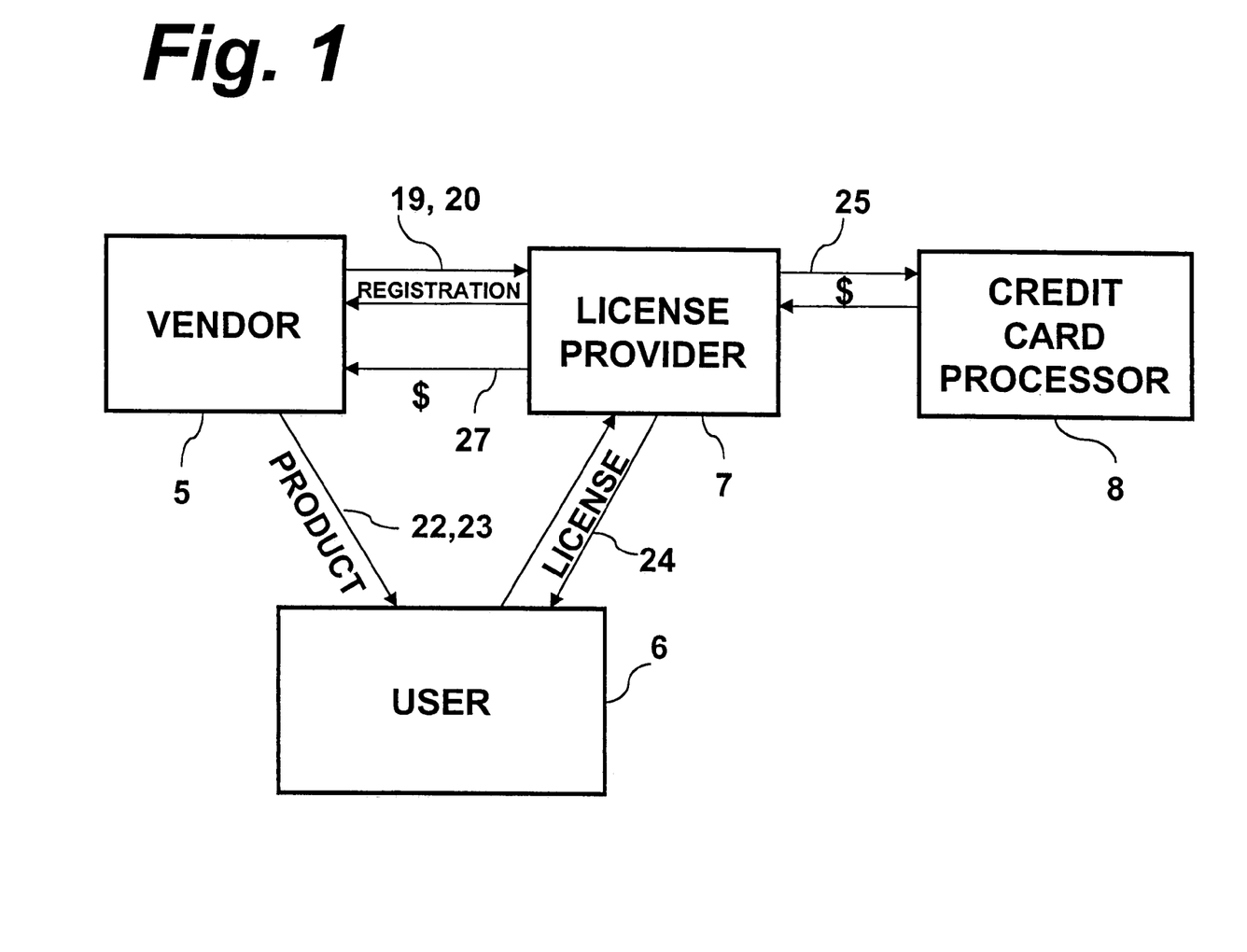
FIG. 1 is a schematic illustration of the system and method of the present invention.
Figure 2:
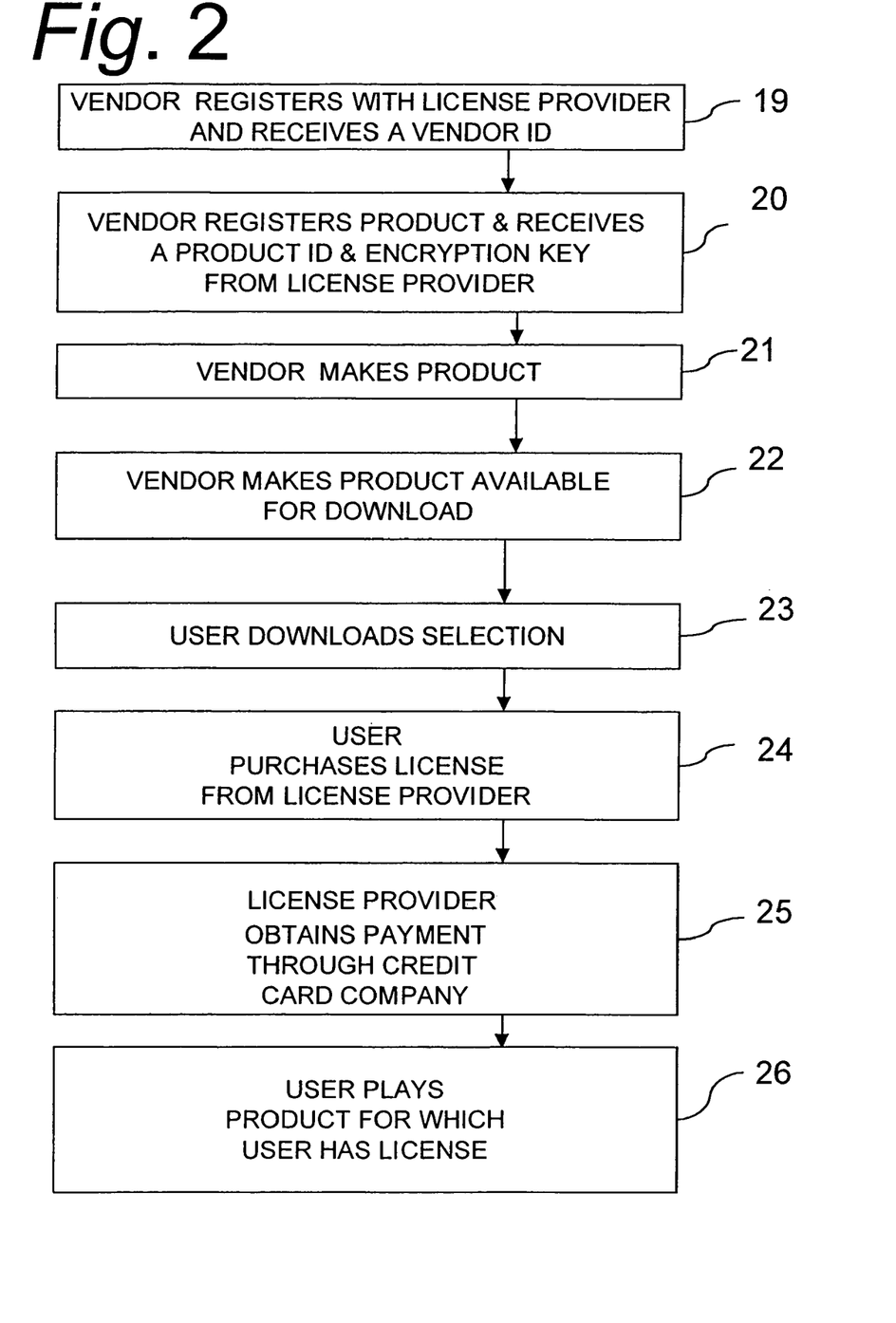
FIG. 2 is a flow chart describing the process for creating a Product, distributing and licensing the Product, and using a licensed Product.

As illustrated in rudimentary form in FIG. 1, the system and method of the present invention coordinates the activities of an author, artist or producer ("Vendor") 5, an end user ("User") 6 of the copyrighted materials, a "License Provider" ("License Provider" or "LP") 7, and an entity for processing payment transactions including credit card purchases, debit card withdrawals, electronic cash distribution or the like ("Credit Card Processor") 8. The basic steps in a method according to this invention are illustrated in FIGS. 1 and 2. The Vendor 5 registers itself with the License Provider (step 19). The Vendor 5 registers a prospective Product 10 with the License Provider 7(20). The Vendor 5 then creates a Product 10 (step 21). The Vendor 5 makes the Product available to Users 6 on or through Electronic Media, such as via the Internet, ftp, CD, or e-mail (step 22). The User 6 downloads selected Products from the Vendor 5 and is able to view a preview of the contents of the Product (23). If the User 6 wants to view and own the right to use the entire contents, the User 6 then purchases a license from the License Provider 7 for that Product (24). The License Provider 7 in turn passes the User's credit card information through a Credit Card Processor 8 or other transaction agent to obtain payment (25). The License Provider then sends, or makes available for download, a License for that User for the Product. The User 6 is able to fully play and view the Product 10 (26) subject to constraints determined by the type of license purchased. The License Provider 7 pays the Vendor 5 for sales of its registered Products (27).

Figure 3:
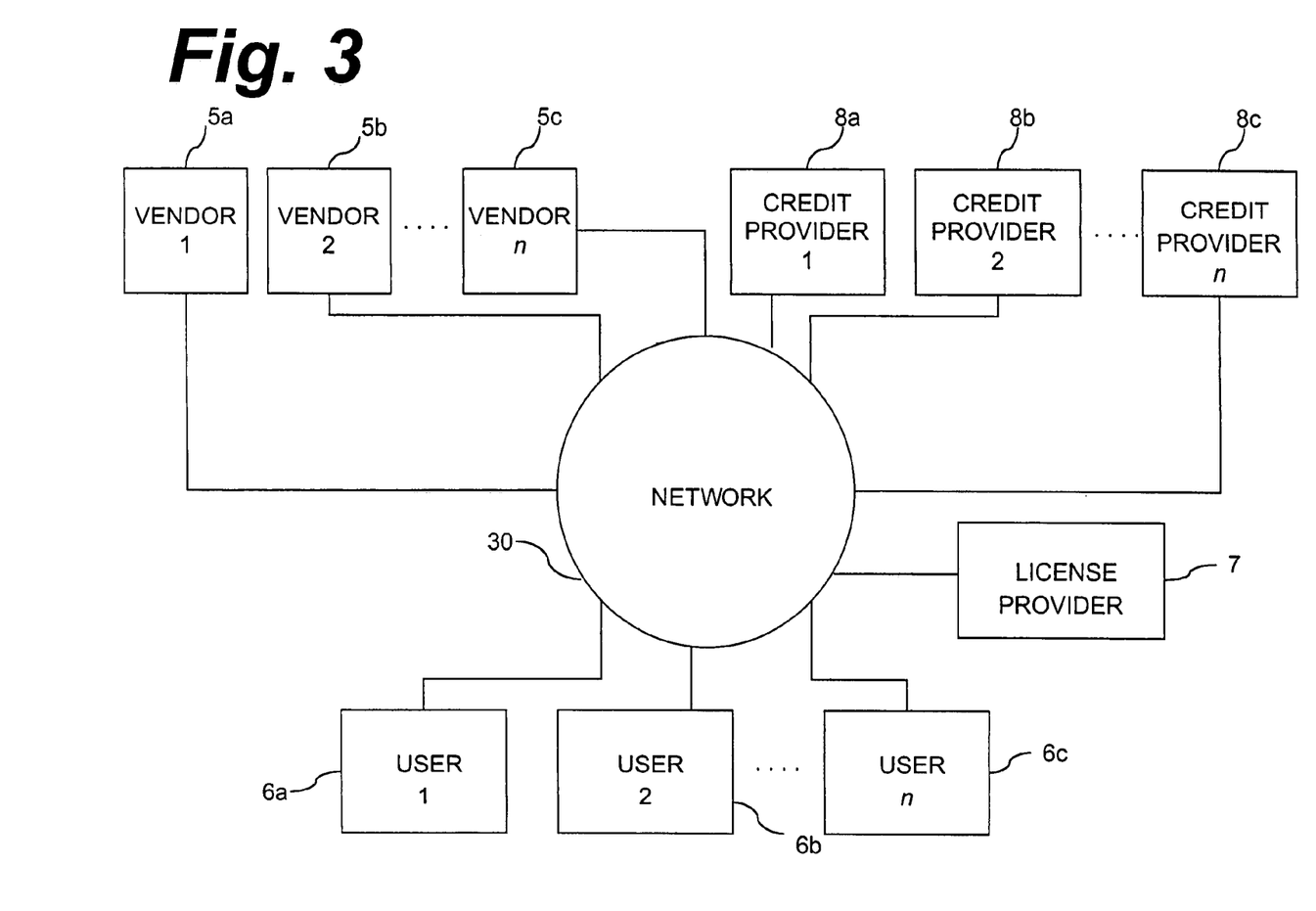
FIG. 3 is a schematic illustration showing how multiple Vendors and Users are coordinated through the system and method of the present invention.

As illustrated in FIG. 3, the system and method of the present invention accommodate multiple Vendors 5a–5c, multiple Users 6a–6c, and multiple Credit Card Processors 8a–c. In a preferred embodiment, the Vendors 5 store Products 10 on servers and make Products 10 available to Users 6 over a network 30, such as the Internet, for download onto their personal computer hard drives or other mechanism for storing electronic or digital data. The License Provider 7 stores license and Product information, but not necessarily the Products 10 themselves, on a server. The License Provider 7 makes licenses available for Users 6 to purchase over the Internet. The License Provider 7 is networked, either through a dedicated connection or through the Internet to Credit Card Processors 8.

Figure 4:
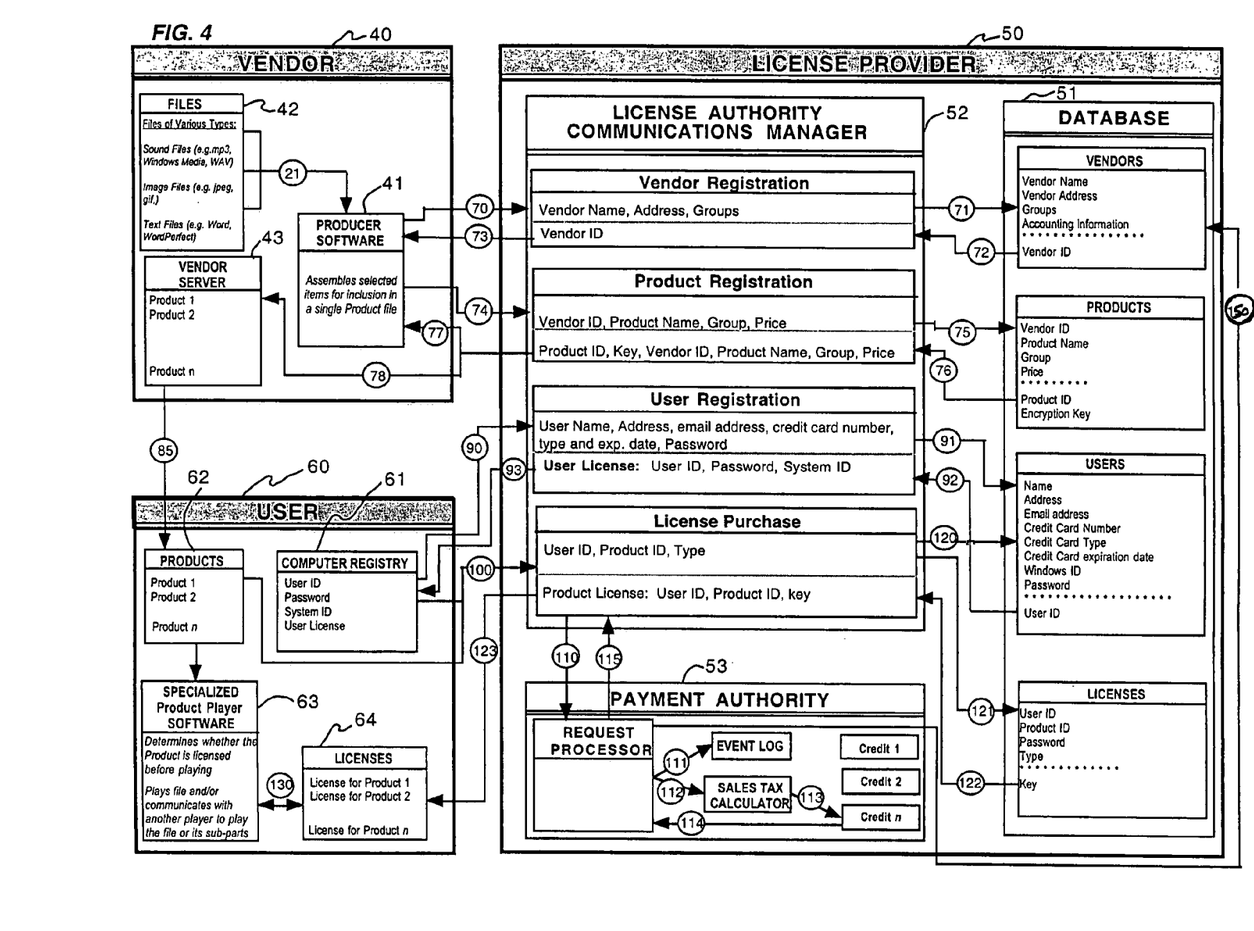
FIG. 4 is a detailed schematic illustration of the system and method of the present invention.

The Users 6, Vendors 5, and License Provider 7 use a combination of hardware, software and databases to accomplish functions in the system and method of the preferred embodiment of the present invention. As illustrated in FIG. 4, the Vendor's component 40 includes software 41 for producing Products ("Producer Software"), file storage space 42 for the files that are used to make Products 10 and a server 43 with file storage space for storing Products 10 and through which Products 10 are made available for download. In the illustration, Products 10 are shown being hosted for download on the Vendor's server 43. However, the Vendor alternatively, or in addition, can make Products 10 available on web sites hosted by others or via any other channel of distribution for electronic or digital media.

Figure 5:
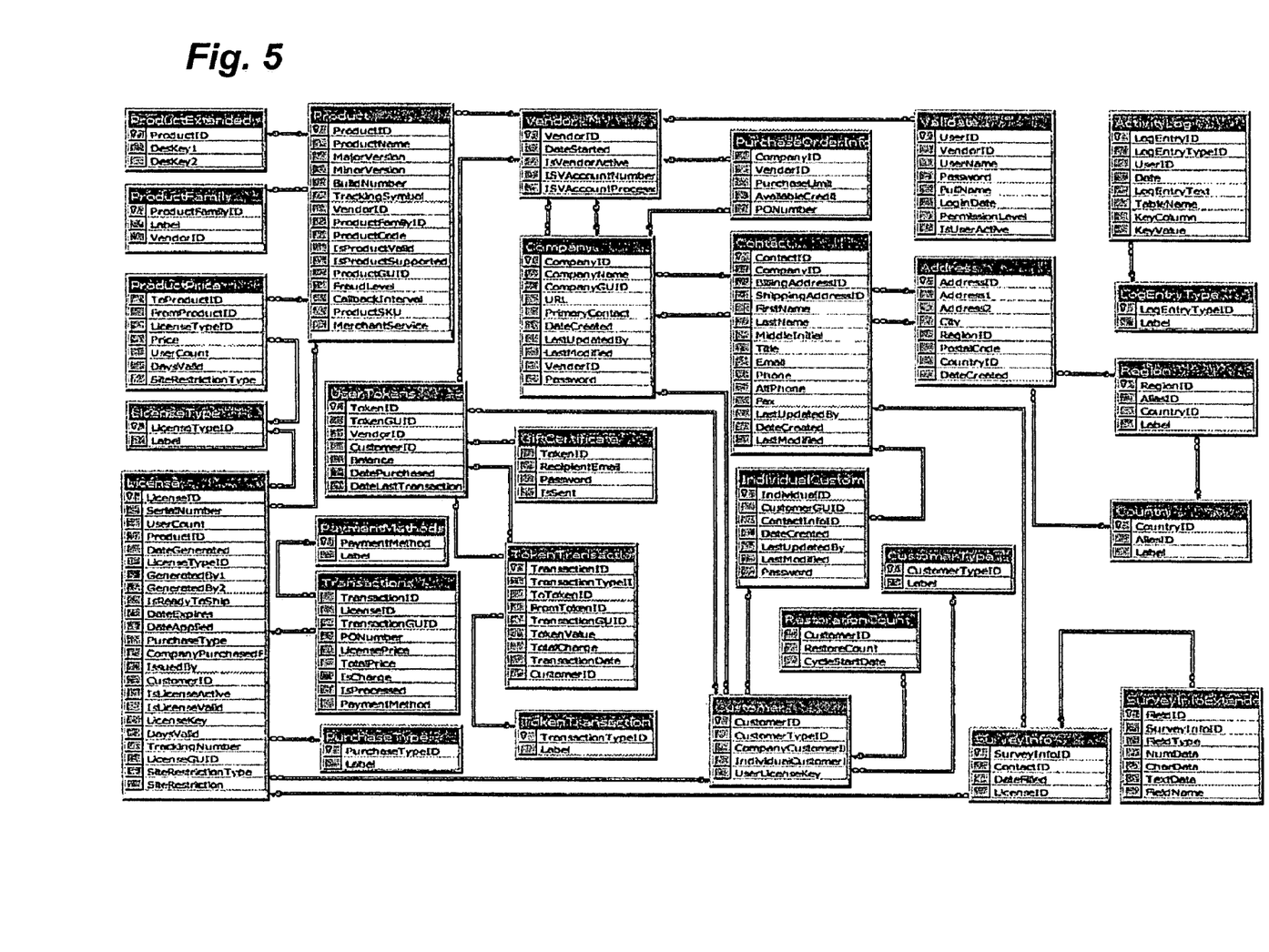
FIG. 5 is an illustration of a database for use in conjunction with the License Provider's database.

In the preferred embodiment illustrated, the License Provider's component 50 includes generally three sub-components: a Database 51, a License Authority Communication Manager 52 ("License Authority" or "LA"), and a Payment Authority ("PA") 53. The Database 51 stores data regarding registered Vendors 5, registered Products 10, licensed Users 6, Licenses, and various other administrative information such as license revenue and other accounting functions related to the Licenses. FIG. 5 shows a more detailed list of the types of data that Database 51 preferably contains.

License Authority 52 is the command and control center of the License Provider 7. It manages communications between User components 60 and the License Provider's backend server functions (Database 51 and Payment Authority 53). It accepts service requests from the User component 60 for purchasing of Licenses; processes credit card transactions through the Payment Authority 53; and creates licenses and saves them in the Database 51. Payment Authority 53 handles credit card authorization and charges.

The User's component 60 includes storage for their system identification information and for their User License (e.g. their computer's registry) 61, storage 62 for Product files 10, software 63 for playing and viewing Products 10 and for managing Product licenses, and storage 64 for Licenses. Software 63 may be a single software product or a combination of more than one software product. For music Products 10, music players such as Winamp and Windows Media Player can be used with a plug-in provided to handle licensing and decryption. In one preferred embodiment of the User's component 60, several software products available through J. River are employed. For example, Media Jukebox™ organizes and plays digital music, License Managers™ keeps track of a User's digital licenses and allows backup and restoration of licenses, and a Buy Button™ component provides for expeditious purchasing of Licenses. Buy Button communicates directly through Remote Procedure Calls (RPC) to the License Authority 52 of the License Provider component 50 to make purchases and, upon completion of a purchase, saves a license on the User's component 60.

In a preferred embodiment, the Vendor, User and License Provider components 40, 50, 60 are connected to one another for data transmission via a computer network, such as the Internet. Preferably, the Vendor and the License Provider components communicate via Remote Procedure Calls ("RPC"). Alternatively, the License Provider's component 50 and/or the Vendor's component 40 may include web servers for hosting web sites to facilitate communication. For example, the Vendor's web site may include pages advertising Products 10 for Users' selective download. The License Provider's site would have pages or screens for soliciting information about the User 6 (e.g. name, address, credit card) and for returning Licenses to the User 6.

The steps 19–27 involved in a preferred method and system of the present invention are now described in greater detail, with reference to FIG. 4.

Vendor Registration (Step 19)

The Vendor 5 registers with the License Provider 7. Specialized producer software 41 facilitates this process. Specialized software 41 communicates via remote procedure calls ("RPC") with the License Provider's component 50. The Vendor 5 is asked to provide its contact information (e.g. name, address, phone number, as well as accounting information to facilitate later payment by License Provider 7 to Vendor 5 for licenses sold for Vendor's Product)(step 70). The License Provider 7 stores this information in its database 51 (71), assigns and stores a unique Vendor identification number ("Vendor ID")(72), and returns the Vendor ID to the Vendor 5(72, 73). The Vendor ID is stored in the Vendor's computer and is automatically accessed by the producer software 41 each time the Vendor 5 seeks to register a Product 10.

Product Registration (Step 20)

The Vendor 5 registers a prospective Product 10 with the License Provider 7. The Product Registration process (20) does not require or provide for the Vendor 5 to send the Product file itself to the License Provider 7. Rather, the Vendor 5 merely sends information regarding the Product 10 and the Vendor 5 to the License Provider 7, and the License Provider 7 returns information that is added to the Product file 10 using the specialized producer software 41. In a preferred embodiment, information is passed between the Vendor 5 and the License Provider 7 via a website hosted by the License Provider 7 on the internet.

More specifically, when a Vendor 5 seeks to register a Product 10, the Vendor 5 accesses the License Provider's web site and submits its name. The License Provider 7 searches its database 51 of Vendors to determine whether the Vendor 5 is already registered. If the Vendor 5 is not registered, the License Provider 7 provides a screen for entry of data about the Vendor 5. The Vendor 5 is asked to provide its contact information (e.g. name, address, phone number, as well as accounting information to facilitate later payment by License Provider 7 to Vendor 5 for licenses sold for Vendor's Product) (step 70). The License Provider 7 stores this information in its database (71), assigns and stores a unique Vendor identification number ("Vendor ID")(72), and returns the Vendor ID to the Vendor 5. The Vendor ID is stored in the Vendor's computer and is automatically accessed by the producer software 41 each time the Vendor 5 seeks to register a Product 10 subsequently.

For subsequent Product registrations, when the Vendor 5 selects "Product Registration", the Vendor's computer will automatically access the Vendor ID from the computer's registry and will send the Vendor ID with the submission. The License Provider 7 will read the Vendor ID, find it in its database 51 and then make a product registration screen available to the Vendor 5. The Vendor 5 is asked to enter a Product name, the price of the Product and a "group" (74) from a predefined list of groups. In a preferred embodiment, the Vendor 5 is allowed to define their own groups, where a group will typically be a type of music or other such classification. The Product name must be unique within the group. The License Provider 7 stores this Product information in its Database 51 (step 75). The License Provider 7 assigns a unique Product identification number ("Product ID") and an encryption key (76) and returns this to the Vendor 5 (77). The Product ID and encryption key are added to the Product file by the producer software (78).

Product Creation (Step 21)

In a preferred embodiment, the Vendor 5 uses specialized software 41 to create a Product 10 for distribution and licensing through the system and method of the present invention. The producer software converts selected digital audio and supporting multi-media elements into a Product 10. There are, generally, three steps in this process: compression, collection, and file creation/registration. The first step is the conversion of either traditional digital audio (CDs) or uncompressed Windows Audio Format (.wav) files into a compressed format.

The second step is the collection of supporting information to be added to the compressed audio file. Such supporting information may include text such as lyrics or liner notes, graphics and video content. Security features such as watermarking technology can be incorporated to add another level of protection to the file.

The final step is the compilation of audio, text, and graphics files into a single file, i.e. a Product 10.

The present invention producer software 41 allows the Vendor 5 to rip, encode, encrypt and compile tracks accompanied by images, text and URL's. To begin using the the producer software 41, the Vendor 5 inserts a CD into the computer's CD drive or otherwise loads or selects items to be included in the completed Product. Preferably, a Project Wizard guides the Vendor 5 through all the steps in creating a MusicEX™ file. If the Vendor 5 does not need to rip and encode tracks from a CD, and just wants to create a Product 10 with existing digital files, the Vendor 5 will choose "Create new Media Project" instead. The software 41 displays a list of tracks contained on the CD. If the tracks on the CD are included in the publicly available cddb database (www.cddb.com), their titles will appear. These tracks can then be selected and deselected, depending upon which ones the Vendor 5 wants to include in the Product 10. Next the Vendor 5 selects the quality and format of the tracks that are being ripped and encoded. The Vendor 5 is asked to choose a preferred compression and bitrate. Any of the listed compression types can be stored within the single Product. After the tracks are copied, a Track Layout window appears. If the Vendor 5 wants to add other files to ones that have just been copied, he/she can simply drag and drop them into the window or use the "Add File" and "Delete File" functions to organize tracks. Once the desired tracks are organized, the Vendor 5 can add text notes describing the CD or individual track notes and lyrics. CD and individual track Images can also be added simply by drag and drop, or if necessary, by using the built-in scan functionality. Imported bmp or tif images are automatically converted to jpg. Once the Vendor 5 has compiled the applicable tracks, text and images, he/she will need to "Compile Virtual CD." This takes the files just created, adds the Product ID and encryption key, and transforms them into a Product.

In alternative embodiments, the order of steps 19-21 can be modified and software 41 can be adapted according to the preferred order or to accommodate a variety of orders. In any event, to generate a Product 10 that is ready for distribution, the Vendor 5 registers itself (19) and its Product (21) with the License Provider 7 and compiles a Product file 10 that incorporates the selected content and an encryption key and Product ID into its Product file (20).

Product Distribution (Step 22)

Once this file is assembled with the Product ID and encryption key, the Vendor 5 can distribute the Product, with its Product ID attached, on CD, in an ftp server, via e-mail, by making it available for download from one or more locations on the world wide web, or using any other electronic media (85).

The Product includes a preview that is accessible to a prospective User 6 without purchasing a License to the full content of the Product.

License Purchase (Steps 24 and 25)

When a customer decides to purchase the right to enjoy the full capabilities of a Product, the User 6 must purchase a License from the License Provider 7. This process is initiated in software running on the User's component 60 and through a data transfer connection to the License Provider 7, such as through an Internet connection.

In a preferred embodiment, the specialized software 63 calls the License Authority 52 on the License Provider's server via RPC calls. The User 6 is asked to provide identifying information including their name, address, email address and credit card number, type and expiration date (90). The first time a User 6 purchases a product, the License Provider 7 stores the information in its database 51 (91) with an assigned unique user identification number ("User ID"). The User License is returned to the User's component (92, 93a). The User License contains the unique User ID and the User's personal data. A User License is saved or updated in the User's computer in encrypted form (93b). Preferably, this User License contains or is attached to the User's credit card information as a deterrent to the User providing his/her User License to others. This User License is created only once for a given User 6 but is updated every time the User 6 makes a purchase. The User 6 can back up the User License, which can then be restored in case of a hard disk failure. A backed-up User License can also be restored to a different machine so the same User 6 will not have multiple User Licenses when using multiple computers. The personal information is locked by the User's password.

The second and subsequent times that a User 6 seeks to purchase a license, the User's name, address, credit card information will be shown to the User 6, after the password is entered and the User 6 can modify it if desired.

Once the User 6 is registered, the User 6 can send to the License Provider 7 a request to purchase a specified Product 10 (100). The License Authority 52 processes the purchase information received, i.e. the User ID, credit card information and Product ID. It first does a rudimentary check to make sure that the credit card number has the appropriate number of digits, that the state in the address is recognizable and that the first line of the address is present. If the User's information passes this check, the credit card information coupled with the Product information, including Product ID, Product Name and price, are forwarded to the Payment Authority residing on the License Provider's server (110). The Payment Authority then logs the transaction (111), calculates sales tax (112), and routes the information to a credit card merchant or other transaction processor for processing (113). When the charge is approved (114, 115), the License Provider's server creates or updates (depending on whether the User 6 is making a purchase for the first time) entries in the database of the User's personal information (120) and then creates a Product License, saves it in the database 51 (121), and sends a copy back to the User 6 (122, 123). The Product License includes the Product ID, the User ID, the Product name and the Vendor 5 name, and the license type. The Product License is written to the registry of the User's computer in encrypted form.

Playing a Product (Step 26)

Figure 6:
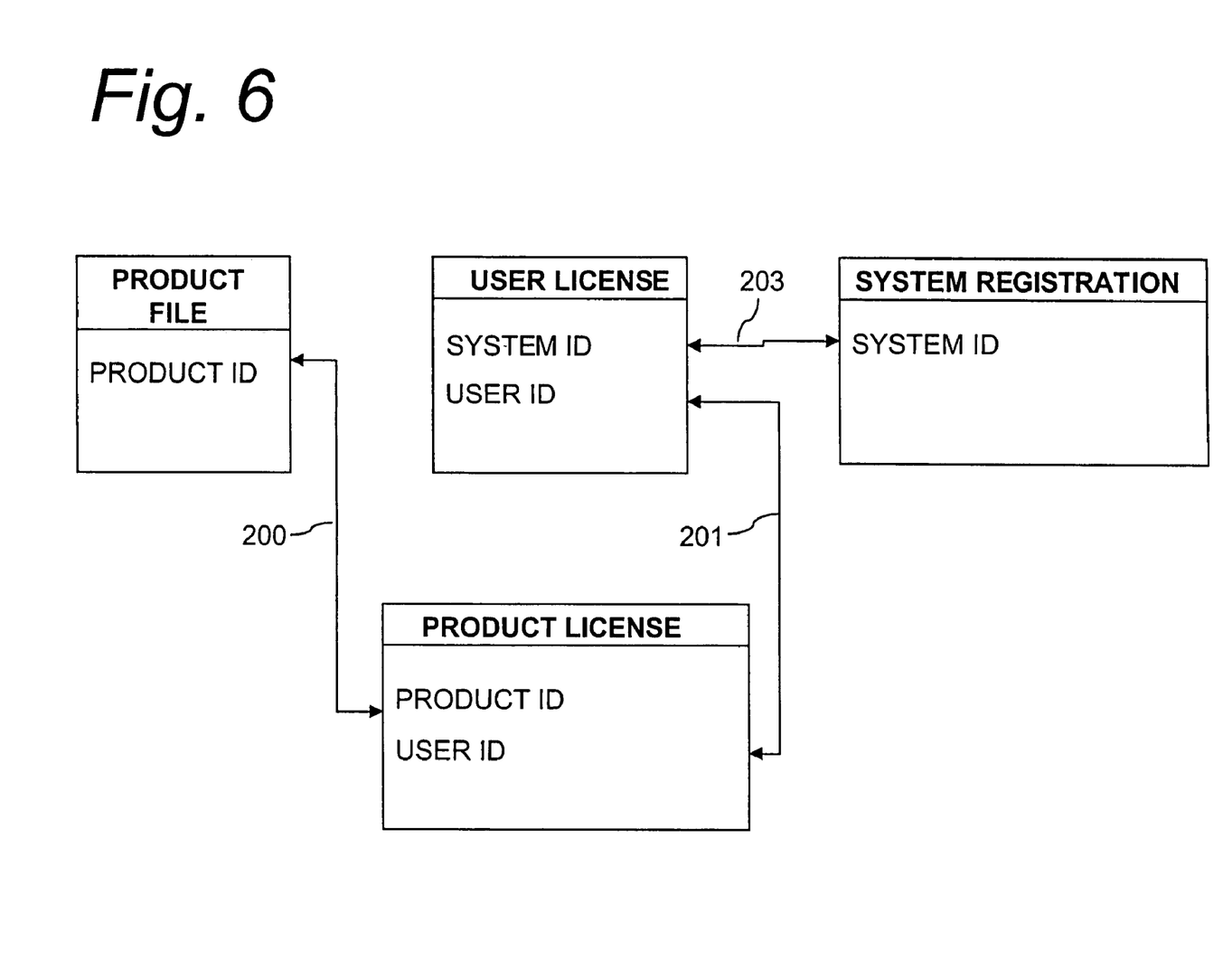
FIG. 6 is a schematic illustration of the security checks made to verify that a Product License authorizes the playing of a given Product, according to the system and method of the present invention.

A User 6 accesses specialized software 63 on his/her computer to play a licensed Product. This specialized software 63 evaluates whether a User is authorized to view and play the full contents of a Product (130). A Product License is tied to the User's User License, since it contains the User ID. As illustrated in FIG. 6, each time a Product 10 is played, the information in the Product License is checked against information in the User License to make sure they match (200). Specifically, the specialized software 63 reviews the Product ID in the Product file and searches for a Product License bearing the same Product ID. The software 63 then compares the User ID on the Product License to the User ID in the User License stored in the computer's registry (201). The software 63 also checks the System ID in the User License to confirm that it matches the System ID in the computer registry (203). In the case of pay per use licenses, the specialized software keeps track of how many usages have occurred and remain. In the case of time-based licenses, the specialized software ensures that the current time is in the range specified by the license.

The Product file remains encrypted until the moment it plays, and always reverts to preview mode if transferred to another computer.

In a preferred embodiment, the following protocols are used to control Product licenses and minimize opportunity for someone to distribute licensed material to unauthorized users, while at the same time allowing Users the flexibility to move licenses from one computer to another and to distribute Products 10 that can then be licensed to other Users:

Upon an initial successful purchase of a Product license, a User License is created in the User's name. This User License is saved in the User's registry in encrypted form and contains the System ID of the User 6 as well as the user's personal information, in particular credit card information. The personal information is locked by the user's password. Any purchased Product license is linked to the User 6 by means of a reference to the User ID.

Transferring Product Licenses to another machine without also transferring the User License will render the Product Licenses invalid.

Users are warned against giving their User License to another person because it contains the User's credit card information. This is a big disincentive for a User 6 to give away his or her User License.

In order to transfer licenses from one machine to another (licensed Users are allowed to do this), one has to use specialized software 63 to back up one's User License from one machine to a floppy disk and then restore it, using Specialized software 63 again, on the other machine. Specialized software 63 can then retrieve all Product Licenses that the User 6 owns from License Provider's server.

In order for a User 6 to perform the above procedure, the User 6 must enter their password. Specialized software 63 will not restore licenses if the correct password is not entered.

The License Provider server keeps track of the number of times license restoration is attempted by a User. A limit is placed on how many times one can restore licenses from the server. For some Users 6 whose User Licenses contain no credit card information, a low limit is placed, such as three or four. After four successful restoration of licenses, the User 6 who attempts the fifth will be asked to enter a valid credit card number. The License Provider server must validate the card number before granting the fifth restoration. So Users will be discouraged from giving away their User Licenses not because of exposure of their credit card information but because they may lose their ability to restore their licenses (they will be loudly warned of this consequence).

For Users whose User Licenses do contain credit card information a limit is also placed on the number of restorations allowed. This limit however is much higher, preferably ten restorations per year.

Registry data that was exported without the involvement of specialized software 63 is invalidated. To achieve this, an ID of the machine (such as the Windows registration name, hard disk ID, or user's login name) can be used, as illustrated in FIG. 6. Specifically, every time a User License is saved to registry, the User's system ID is also saved. The ID is bundled with the User License and encrypted, so the User License exported from registry without involvement of Specialized software 63 is invalid. Each time a licensed Product is being played, the specialized software 63 checks the system ID on the machine and make sure it matches the one saved with User License. This will not create any trouble for Users. If a user's operating system crashed, the unfortunate User would have to restore the licenses anyway, using specialized software 63 which would get the new system ID and save it with the User License.

Accounting and Payment to Vendor (Step 27)

The Payment Authority 53 stores data regarding each transaction in the Database 51 (150). The License Provider preferably sorts transactions by Vendor periodically to determine and make lump sum payments due to Vendor for the licenses sold in connection with their Products for the period. The transaction information can be mined to give Vendors useful sales data.

Security

Public/private key encryption and symmetric encryption algorithms are used for encrypting sensitive data involved in communication between the Vendor and the License Provider and between the User and the License Provider.

Although an illustrative version of the system and method is shown, it should be clear that many modifications to the system and method may be made without departing from the scope of the invention.

What is claimed is:

1. A method for distributing digital licenses over a computer network from a centralized database for a digital product comprising the steps of:
   a) receiving a request, via computer network, for product registration from a vendor, said request including a product name and a vendor identifier;
   b) assigning a product identifier and an encryption key to said product and forwarding registration to vendor, said registration including a product identifier, said key and said vendor identifier;
   c) receiving a request, via computer network, from a user for a user license, said request including a user name and payment information;
   d) assigning a user identifier to said user and forwarding a user license, via the computer network, to said user, said license including said user identifier;
   e) receiving a request, via computer network, for a product license from said user to use said product, said request including said user identifier and said product identifier;
   f) issuing a product license, via computer network, to said user, said product license including a user identifier, the product identifier and a decryption key that mates with said encryption key; and
   g) storing in a relational database the vendor records, product records, user records and product license records, with the product record linked to the vendor record via the vendor identifier, and with each product license linked to a user record via the user identifier.

2. A system for distributing product licenses comprising:
   a) a server connected to a vendor computer and to a user computer for data connection there between;
   b) means for receiving from the vendor a request for product registration where said request includes a product name and a vendor identifier;
   c) means for assigning a unique product identifier and an encryption key to said product;
   d) means for assigning a user identifier;
   e) means for transmitting to the vendor a product registration, said registration including said product identifier and said encryption key;
   f) means for receiving from the user via said data connection a request for a product license, said request including said user identifier and the product identifier;
   g) means for transmitting to the user a product license including a previously assigned product identifier, a user identifier and a decryption key that mates with said encryption key; and
   h) a relational database for storing vendor records, product records, user records and product license records, and for linking the product record to the vendor record via the vendor identifier, and for linking each product license to a user record via the user identifier.

3. A system according to claim 2, wherein each said user record includes a user name.

4. A system according to claim 2, wherein each said user record includes a password.

5. A system according to claim 2, wherein each said user record includes the user's credit card number.

6. A method according to claim 1, wherein each said user record includes a user name.

7. A method according to claim 1, wherein each said user record includes a password.

8. A method according to claim 1, wherein each said user record includes the user's credit card number.

* * * * *